(12) United States Patent
Mohazzab et al.

(10) Patent No.: US 8,083,359 B2
(45) Date of Patent: Dec. 27, 2011

(54) CORNER CUBE RETROREFLECTOR MOUNT

(75) Inventors: Masoud Mohazzab, Andover, MA (US); Michael Scott Cafferty, Medford, MA (US)

(73) Assignee: MKS Instruments, Inc., Andover, MA (US)

( * ) Notice: Subject to any disclaimer, the term of this patent is extended or adjusted under 35 U.S.C. 154(b) by 685 days.

(21) Appl. No.: 11/943,084

(22) Filed: Nov. 20, 2007

(65) Prior Publication Data

US 2009/0128910 A1    May 21, 2009

(51) Int. Cl.
*G02B 5/122* (2006.01)

(52) U.S. Cl. .................................. 359/529; 359/549

(58) Field of Classification Search .............. 359/526, 359/529, 531–533, 549, 535; 248/346.01, 248/346.03–346.5, 900, 542, 688–689
See application file for complete search history.

(56) References Cited

U.S. PATENT DOCUMENTS

| | | | |
|---|---|---|---|
| 3,977,765 A | 8/1976 | Lipkins | 350/102 |
| 5,122,901 A | 6/1992 | Bleier | 359/529 |
| 5,301,067 A | 4/1994 | Bleier et al. | |
| 5,335,111 A * | 8/1994 | Bleier | 359/529 |
| 5,361,171 A | 11/1994 | Bleier | |
| 5,589,991 A | 12/1996 | Bleier | 359/856 |
| 5,675,412 A | 10/1997 | Solomon | 356/345 |
| 5,949,543 A | 9/1999 | Bleier et al. | |
| 6,141,101 A | 10/2000 | Bleier et al. | |
| 6,473,185 B2 | 10/2002 | Vishnia et al. | |
| 6,729,735 B2 | 5/2004 | Bleier | 359/856 |
| 6,752,503 B2 | 6/2004 | Bleier | |
| 6,786,608 B1 | 9/2004 | Bleier | 359/515 |
| 6,827,455 B2 | 12/2004 | Bleier | 359/879 |
| 6,902,279 B2 * | 6/2005 | Lyons, III | 359/529 |
| 6,945,661 B2 | 9/2005 | Bleier | |
| 7,101,053 B2 * | 9/2006 | Parker | 359/529 |
| 7,140,741 B2 | 11/2006 | Fleming et al. | |
| 7,168,817 B2 | 1/2007 | Bleier et al. | 359/855 |
| 7,196,797 B2 | 3/2007 | Bockman et al. | |
| 2003/0048533 A1 | 3/2003 | Lyons, III | 359/529 |
| 2005/0264822 A1 | 12/2005 | Bockman et al. | |
| 2006/0132918 A1 * | 6/2006 | Couzin et al. | 359/529 |
| 2007/0035836 A1 | 2/2007 | Lyons, III | 359/529 |

* cited by examiner

*Primary Examiner* — Jennifer L. Doak
(74) *Attorney, Agent, or Firm* — Proskauer Rose LLP

(57) ABSTRACT

A retroreflector adapted to be mounted to a motor including a first, second, and third petal having a mutually perpendicular first, second, and third reflective surface that form a retroreflective surface. A base is directly connected to at least one of the first, second, or third petal so as to minimize a vertical profile of the retroreflector. The base is removably connected to the motor with a fastening mechanism. A spatial distance between the fastening mechanism and at least one of the first, second, or third petal minimizes a stress from the motor propagated to the retroreflective surface.

19 Claims, 6 Drawing Sheets

CORNER CUBE RETROREFLECTOR MOUNT

FIELD OF THE INVENTION

The technology generally relates to methods and apparatus for mounting a retroreflector.

BACKGROUND OF THE INVENTION

A moving mirror can be used in a Michelson interferometer for Fourier transform infrared spectroscopy. Moving-mirror interferometers include a beamsplitter for dividing a beam of entrant radiation into two beams. The beams are reunited at the same beamsplitter, after redirection by reflecting elements, one or more of which elements is moved to change the relative path lengths for the two beams within the interferometer. A retroreflector can be mounted to a motor in the Michelson interferometer that enables translational movement of the retroreflecting means, such as a linear flexure motor.

The optical characteristics of the retroreflective surface are attributable to the surface figure of each mirror and mutually perpendicularity of reflective surfaces. The retroreflector's optical characteristic can be affected by gravity, thermal expansion or contraction, mechanical stress etc. Deformation in surface quality of around tens of nanometer or mutual perpendicularity of the order of arc seconds may result in the loss of efficiency in the interferometer.

The disadvantageous effects are generally exacerbated, moreover, when the interferometer is employed in an industrial setting. The interferometer can be difficult to assemble and align after replacement or repair of their components.

SUMMARY OF THE INVENTION

In one aspect, the invention includes a retroreflector adapted to be mounted to a motor. The retroreflector includes a first, second, and third petal having a mutually perpendicular first, second, and third reflective surface that form a retroreflective surface. A base directly connects to at least one of the first, second, or third petal so as to minimize a vertical profile of the retroreflector. The base is removably connected to the motor with a fastening mechanism. A spatial distance between the fastening mechanism and at least one of the first, second, or third petal minimizes a stress from the motor propagated to the retroreflective surface.

In another aspect, the invention includes a retroreflector adapted to be mounted to a motor. The retroreflector includes petals forming a retroreflective surface and a base. The petals and base form a unitary structure that is removably mounted to the motor with a fastening mechanism. A spatial distance between the fastening mechanism and the petals minimizes a stress propagated to the retroreflective surface.

In yet another aspect, the invention includes a retroreflector assembly adapted to be attached to a motor. The retroreflector assembly includes a first petal comprising a first reflective surface, a second petal comprising a second reflective surface, and a third petal comprising a third reflective surface. The first, second and third petal are connected to each other to form a retroreflective surface. The retroreflector assembly also includes a base where one of the first, second, or third petal is connected to the base so as to minimize a vertical profile of the retroreflector. The base is removably mounted to the motor with a fastening mechanism. A spatial distance between the fastening mechanism and the petals minimizes a stress propagated to the retroreflective surface.

The invention, in another aspect, includes a base adapted to mount a retroreflector to a motor. The base includes a receptacle adapted to receive a first, second and third petal forming a retroreflective surface. One of the first, second or third petal is adhered to the receptacle. The base also includes a plurality of passages to removably mount the base to the motor. A spatial distance between the passages and the receptacle minimizes a stress propagated to the retroreflective surface.

The invention, in another aspect, includes a method for manufacturing a removably mounted retroreflector. A region comprising a mutually perpendicular first, second, and third surface is formed from a first structure. A base supporting the region is also formed from the first structure. Passages are disposed in the base adapted to removably mount the base to a motor and minimize a stress propagated to the region. A second structure is formed as a negative copy of the region. The second structure is coated with epoxy and gold. A retroreflective surface is formed by placing the second structure in the region of the first structure.

The invention, in yet another aspect, includes a method for manufacturing a removably mounted retroreflector. The method includes forming a base including an indentation adapted to receive the first, second, and third reflective surface, which, in combination, form a retroreflective surface. A plurality of passages are disposed in the base to removably mount the base to a motor and minimize a stress propagated to the retroreflective surface. One of the first, second, or third reflective surface is connected to the indentation in the base.

In other examples, any of the aspects above, or any apparatus or method described herein, can include one or more of the following features.

In some embodiments, the petals and the base form a unitary structure. The first, second, and third surfaces of the first, second, and third petals, respectively, can be coated to form the reflective surface. In some embodiments, the first, second, and third petals with a first, second and third reflective surfaces are adhered to each other to form the retroreflective surface.

The base can include an indentation and one of the first, second and third petal can be adhered to the base or the indentation in the base. The indentation in the base can be adapted to receive the first, second, and third petal of the retroreflector. In some embodiments, the base includes a receptacle or indentation that forms an angle parallel to an angle formed by the first, second, and third petals. In some embodiments, the receptacle or indentation forms a cylinder.

In some embodiments, the first petal is adhered to the base. Adhesive can be disposed between the first petal and the indentation or receptacle in the base. In some embodiments, room temperature vulcanizing silicone is disposed between the indentation or the receptacle in the base and/or the second and third petal.

The fastening mechanism of the base can include a plurality of passages. In some embodiments, screws are threaded in the passages to mount the retroreflector and/or the base to the motor. The motor can be a linear flexure motor.

The material for the petals and base can be formed from a material having a stable thermal cycle over time. The material for the petals and base can also be formed from a material having minimal hysteresis. In some embodiments, the petals and base are made of aluminum or glass. The petals are reflective and configured to form the retroreflective surface.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1B:
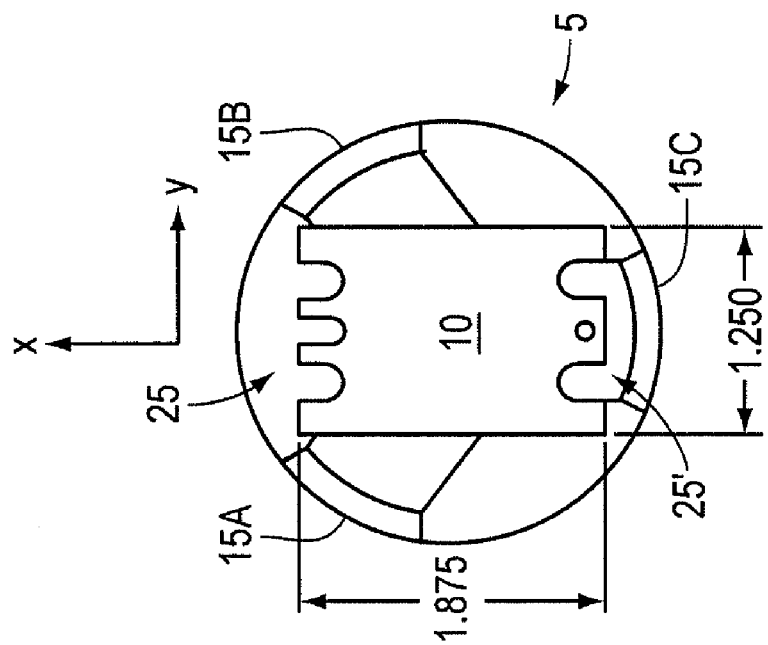
FIG. 1B is an alternative view of the retroreflector and the base forming a unitary structure according to an illustrative embodiment.
Figure 1A:
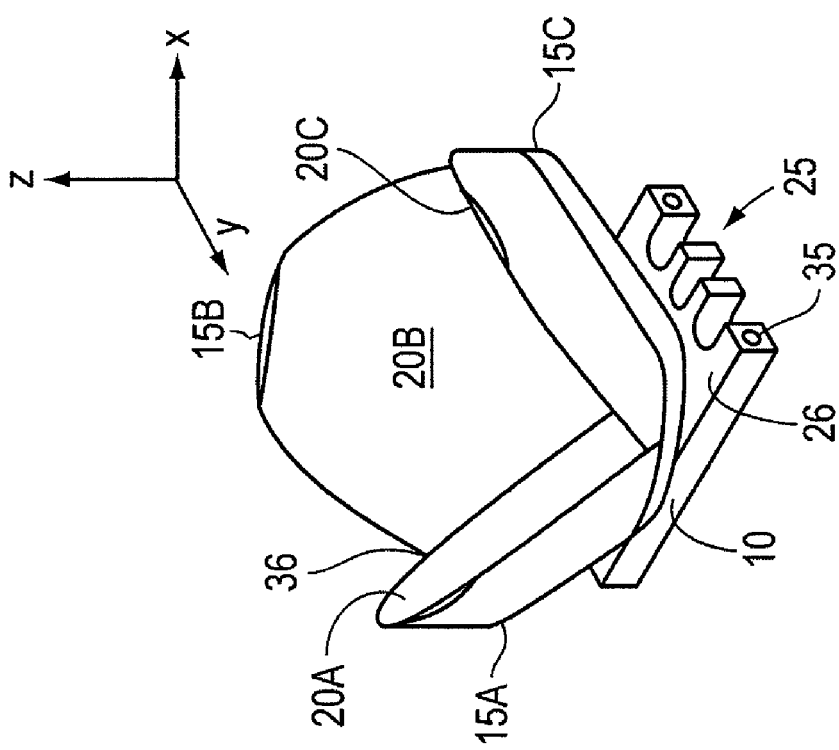
FIG. 1A is a three dimensional drawing of a retroreflector and a base forming a unitary structure according to an illustrative embodiment.

FIG. 1A is a three dimensional figure of a retroreflector 5 and base 10 according to one embodiment of the technology. The retroreflector 5 includes a first petal 15A, second petal 15B, and third petal 15C. Each petal has a reflective surface 20A, 20B and 20C that is configured or machined to be mutually perpendicular to one another, forming a retroreflective surface. The base 10 is configured with a fastening mechanism 25 to removably mount the base 10 and retroreflector assembly 30 to a motor. In this particular embodiment, the retroreflector 5 and base 10 form a unitary structure. The unitary structure can advantageously minimize a vertical profile of the assembly 30 when mounted to the motor since the petals are directly connected to the base. In some embodiments, the base has a thickness of on the order of ¼ inches and the retroreflector has a height on the order of 2 inches, the total assembly having a vertical height on the order of about 2 inches. Alternative dimensions can be utilized for the retroreflector and base to accommodate the size of the motor and the requirements of a system that utilize the assembly.

The base 10 is connected to the first 15A, second 15B and third 15C petal, supporting the retroreflector 5 while minimizing a vertical profile of the assembly 30. The base 10 includes a fastening mechanism 25 that allows the base 10 and retroreflector 5 to be removably mounted to a motor. FIG. 1B is an alternative view of FIG. 1A showing the base 10 of the assembly 30. In some embodiments, the base 10 has a plurality of fastening mechanisms 25 and 25'. In some embodiments, the fastening mechanism 25 and 25' includes a series of passages 35. Screws can be threaded in the passages 35 to mount the base 10 to the motor. In some embodiments, the passages 35 are oriented at varying positions relative to one another. As shown in FIGS. 1A and 1B, some of the passages 35 may be oriented in a direction along the z-axis while others may be oriented in a direction along the x-axis. Varying the number and orientation of the passages and screwing the base to the motor can strengthen the joint between the base 10 and the motor to prevent displacement in different directions and accommodate stresses and strains in different planes.

The fastening mechanism 25 and 25' can be formed to mate with a corresponding fastening mechanism on the motor. In this particular embodiment, the fastening mechanisms 25 and 25' include a plurality of prongs that mate with a corresponding plurality of prongs on the motor's fastening mechanism, thereby providing structural support and strengthening the joint between the base 10 and the motor. While this embodiment utilizes a plurality of prongs, it is contemplated that other fastening mechanisms can be used to mount the base 10 to the motor (e.g., articulator) to provide support for the retroreflector 5 (e.g., cornercube) while minimizing a stress propagated to the cornercube. It can be easier to prevent mechanical stress from transferring from the fastening mechanism 25 and 25' to the retroreflector 5 by disposing the fastening mechanism 25 and 25' further from the retroreflector 5. A spatial distance 26 between the fastening mechanisms 25 and 25' and the retroreflector 5 acts to minimize a stress propagated to the retroreflector. In some embodiments, the distance between the passage 35 and the center of the retroreflector is about 0.9 inches.

The reflective surface of the petals 20A, 20B and 20C forming the retroreflective surface should be flat and should be mutually perpendicular to one another to maximize the efficiency of the retroreflector 5. Changes in shape and deformation of the petals 15A, 15B and 15C can compromise the efficiency of the retroreflector 5. It is desirable that the base 10 and petals 15A, 15B and 15C be made of a material having a stable thermal cycle over time since the retroreflector 5 and base 10 can experience a temperature in the range of 0-60 centigrade. It is also desirable to utilize a material with minimal structural hysteresis. A mirror that has a surface error of about 1/10 wave (HeNe wavelength) peak to valley can be used in the retroreflector 5. The material of the petals 15A, 15B and 15C can have a high surface figure with minimal ripples to ensure a flat reflective surface 20A, 20B and 20C. In some embodiments, aluminum is used to form the base 10 and the petals 15A, 15B and 15C. In the embodiments where the petals 15A, 15B and 15C and base 10 form a unitary structure, the petals 15A, 15B and 15C and base 10 are formed from the same material.

In some embodiments, the motor can be a linear flexure motor. The assembly 30 can be used to provide a moving mirror in a Michelson interferometer. The assembly 30 can be used in the MultiGas™ FTIR-based analyzer products from MKS On-Line Products of Methuen, Mass. Products incorporating the assembly 30 are capable of ppb to ppm sensitivity for multiple gas species in a variety of gas analyzer applications, such as stack emissions monitoring, continuous emissions monitoring (CEM), process monitoring, formaldehyde emissions monitoring, purity monitoring, automobile, diesel, and catalyst exhaust monitoring. InDuct™ FTIR-based gas sensors that incorporate the technology can be used for fault detection, monitoring, control, or endpoint determination.

Figure 2:
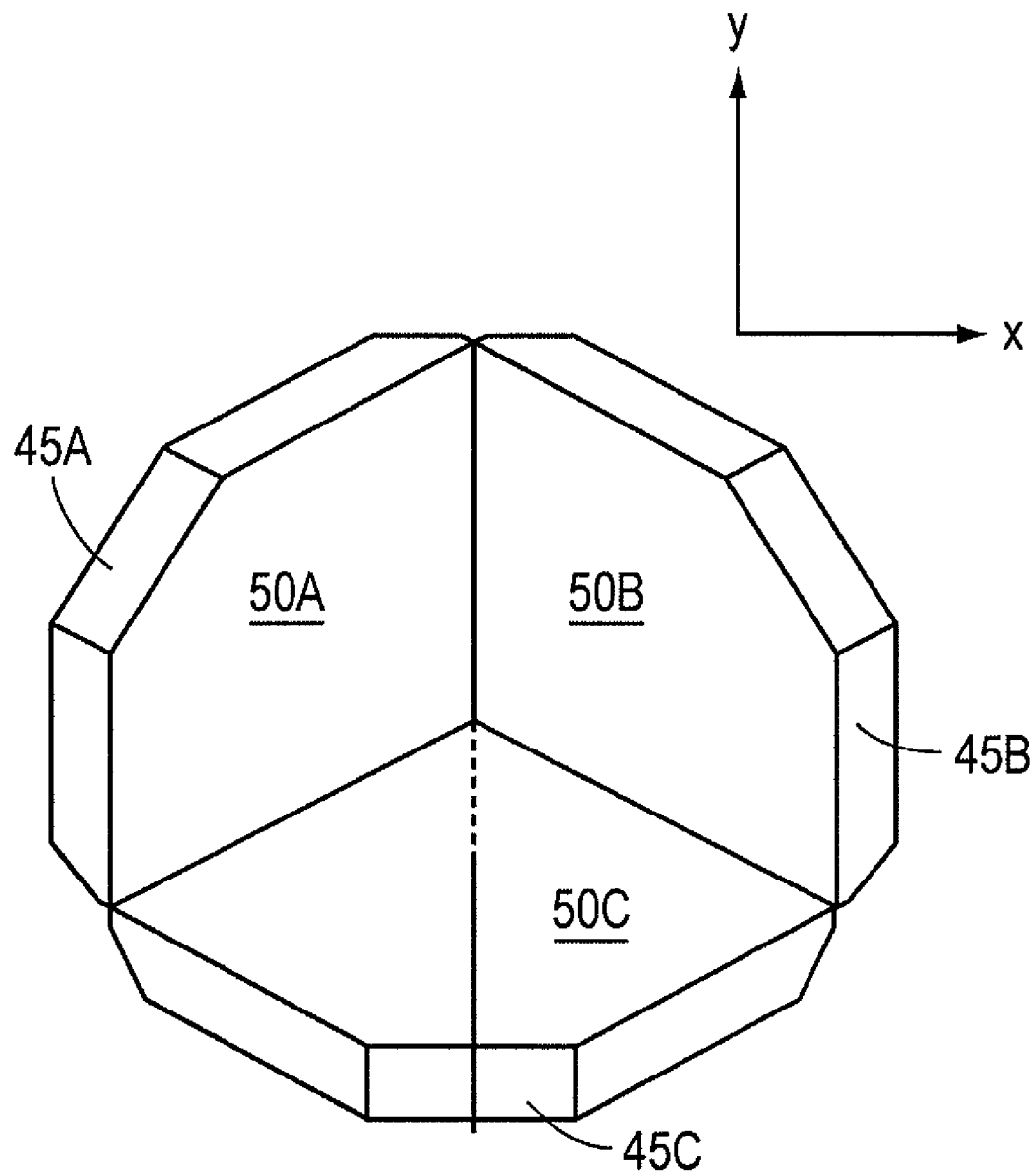
FIG. 2 is a view of a retroreflector according to an illustrative embodiment.

FIG. 2 is a three dimensional figure of an alternative embodiment of a retroreflector 40. In some embodiments, the retroreflector 40 (e.g., cornercube) is formed from individual petals 45A, 45B and 45C. The individual petals have reflective surfaces 50A, 50B and 50C. The individual petals 45A, 45B and 45C can be configured and adhered so that the reflective surfaces 50A, 50B and 50C are mutually perpendicular to one another, forming a retroreflective surface.

Figure 3B:
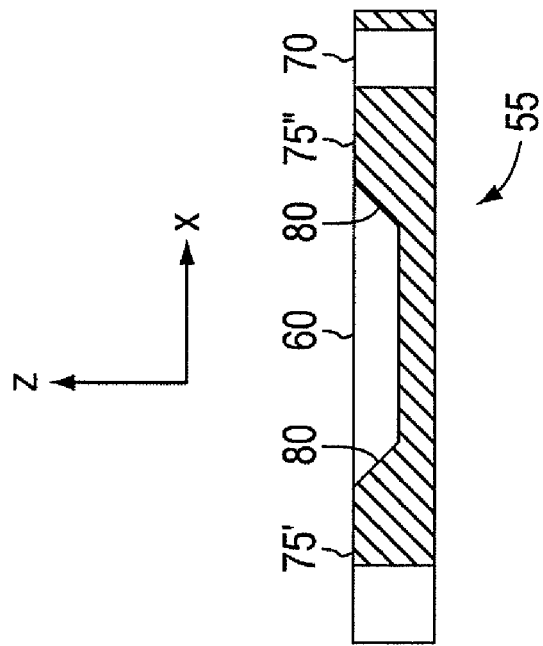
FIG. 3B is a cross sectional drawing of the base, according to an illustrative embodiment.
Figure 3A:
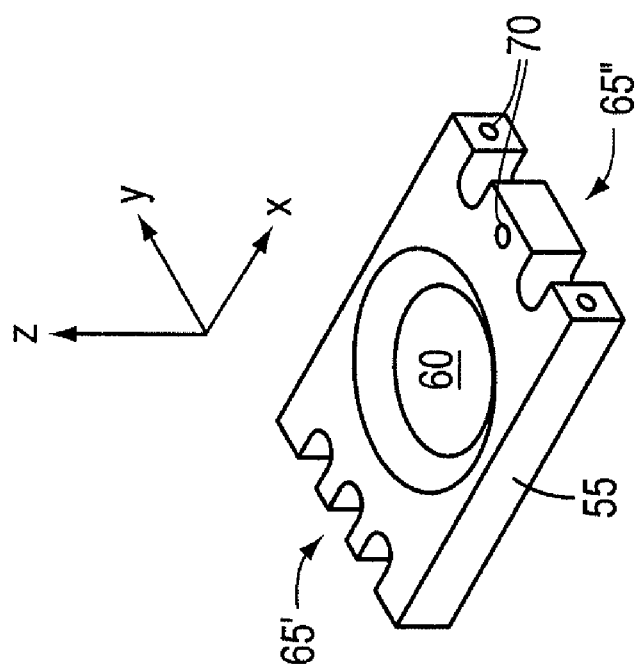
FIG. 3A is a three dimensional drawing of a base, according to an illustrative embodiment.

FIG. 3A is a three dimensional figure of an individual base 55 that can be used to support a retroreflector (such as retroreflector 40 as shown in FIG. 2). The base 55 can have an indentation 60 that cradles the petals of a retroreflector. The retroreflector can be formed from individual petals as shown in FIG. 2 or the petals can form one unitary piece. The base 55 can have fastening mechanisms 65' and 65" configured to mate with a corresponding fastening mechanism on a motor (e.g., articulator), such as a linear flexure motor. In some embodiments, the fastening mechanism 65' and 65" includes a plurality of passages 70 allowing the base 55 to be screwed on to the motor.

FIG. 3B is a cross sectional view of the individual base 55 as shown in FIG. 3A. In some embodiments, the base 55 cradles the petals of a retroreflector (not shown) which can minimize a vertical profile of the base 55 and retroreflector assembly. The base 55 can have a thickness on the order of ¼ inches and the indentation 60 in the base can have a height of about 0.15 inches that correspondingly minimizes the vertical profile of the assembly. The petals of the retroreflector can be directly connected or adhered to the base in the indentation 60, minimizing a vertical profile of the retroreflector and base assembly. A spatial distance 75' and 75" between the fastening mechanism 65' and 65" and the indentation 60 can minimize a stress propagated to the retroreflective surface. In some embodiments, the spatial distance 75' and 75" can be of the order of approximately 0.9 inch. In some embodiments, the indentation 60 is formed as a negative image of the petals of the retroreflector. The sides of the indentation 80 can be parallel to the angles formed by the petals of the retroreflector. In some embodiments, the sides of the indentation 80 may not be angled and the indentation may form a cylindrical receptacle that cradles the petals of the retroreflector.

Figure 4B:
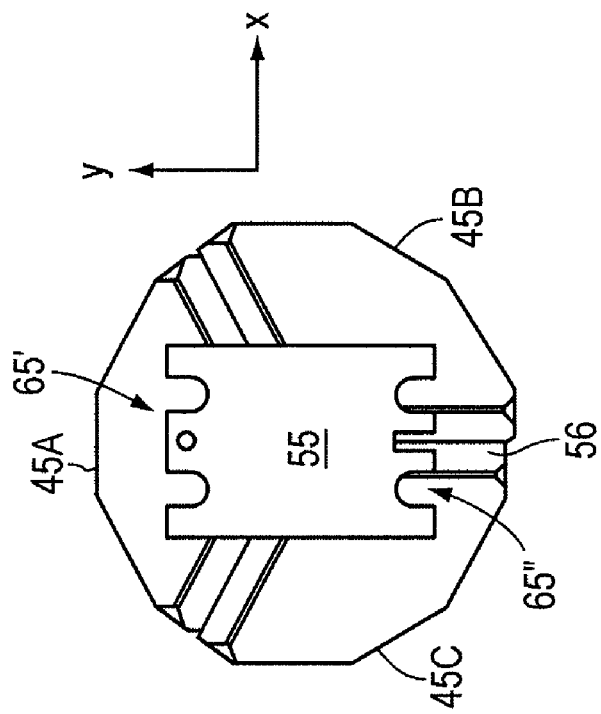
FIG. 4B is an alternative view of the base connected to the retroreflector according to an illustrative embodiment.
Figure 4A:
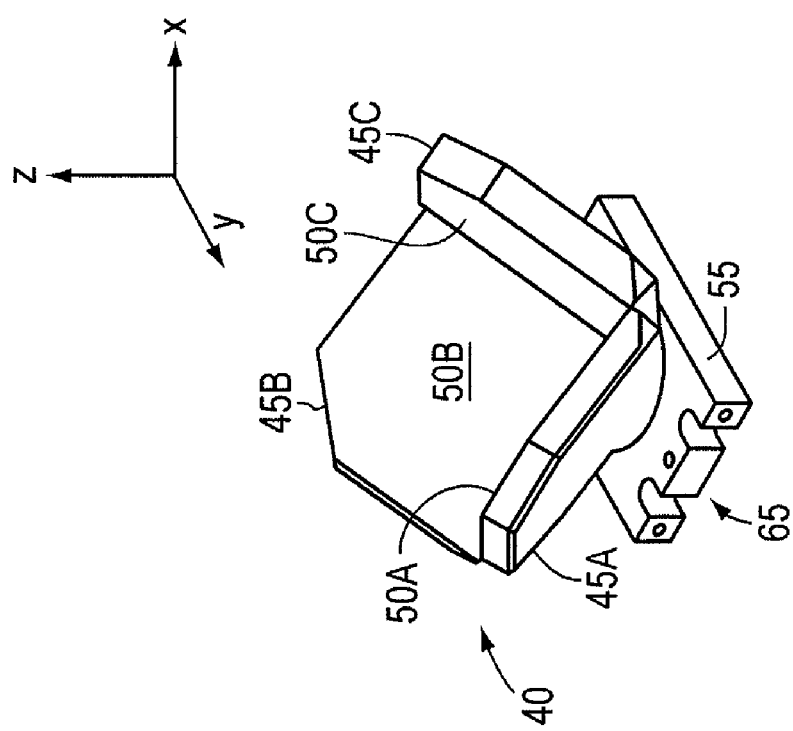
FIG. 4A is a three dimensional view of a retroreflector connected to a base according to an illustrative embodiment.

FIG. 4A is a three dimensional figure of the retroreflector 40 of FIG. 2 connected to an individual base 55 such as the base described in FIGS. 3A-B. The individual base 55 however, can also receive a retroreflector where the petals form one unitary structure. In some embodiments, the base 55 cradles the petals 45A, 45B and 45C of the retroreflector 40 in the indentation 60. The retroreflector 40 can be adhered or connected to a base 55, as the base can be a separate structure from the retroreflector 40. In some embodiments, adhesive is disposed between the indentation in the base and one of the petals 45A, 45B, or 45C of the retroreflector 40. In some embodiments, adhesive is disposed under one of the petals 45A, 45B, or 45C of the retroreflector near where the three petals 45A, 45B and 45C intersect, and on the base 55 for adherence. Room temperature vulcanizing silicone can be disposed between the indentation 60 in the base 55 and the other remaining petals to provide a flexible structural support.

In some embodiments, the base 55 and petals 45A, 45B and 45C are formed from the same material. It is desirable that the base 55 and petals 45A, 45B and 45C be formed from the same material since different materials can have differing coefficients of thermal expansion. The base 55 and retroreflector 40 assembly can experience temperatures in the range of approximately 0-60 centigrade. The base 55 and retroreflector 40 assembly can experience stresses and strains from changing temperatures if the base 55 and petals 45A, 45B and 45C are formed from differing materials. It is desirable to minimize such stresses and strains since deformation of the retroreflector 40 can compromise its efficiency. The material should be stable under thermal cycling and have minimal hysteresis. The mirrors of the petals 45A, 45B and 45C are made of flat surfaces with good surface figure of around 1/10 HeNe wave or better. In some embodiments, the individual petals 45A, 45B and 45C of the retroreflector 40 and the base 55 are made of glass. FIG. 4B is an alternative view of the retroreflector 40 and base 55 assembly of FIG. 4A, showing fastening mechanisms 65' and 65". Fastening mechanisms 65' and 65" can include a plurality of passages that can be used to removably screw the retroreflector 40 and base 55 assembly to a motor. Fastening mechanisms 65' and 65" can also be formed to mate with a corresponding fastening mechanism on the motor. In some embodiments, the fastening mechanism includes a plurality of prongs, however, other configurations can be used.

Figure 5:
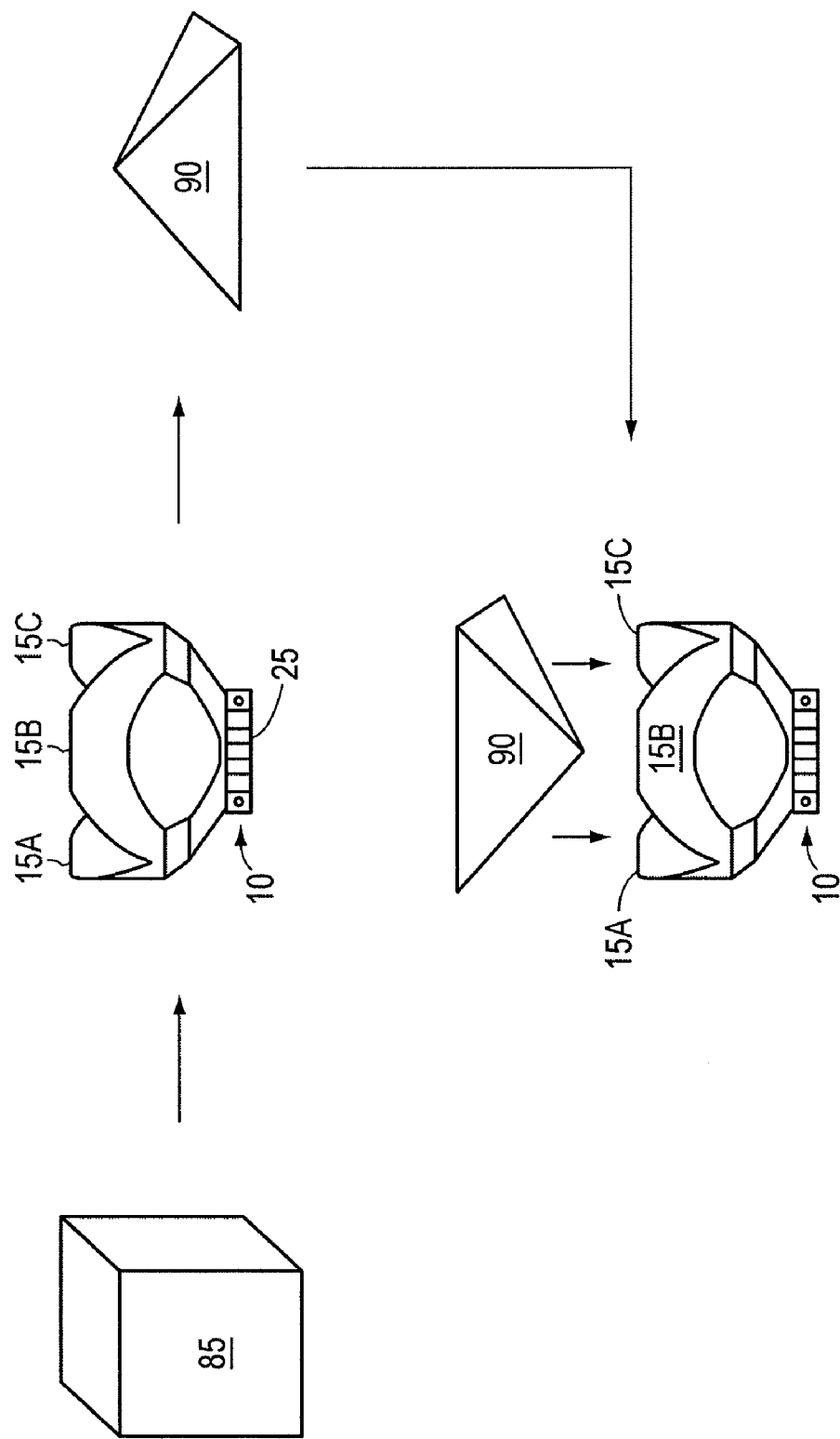
FIG. 5 is a drawing depicting a method for manufacturing a retroreflector and a base forming a unitary structure, according to an illustrative embodiment.

FIG. 5 depicts the steps for a method for manufacturing a retroreflector 5 and base 10 forming a unitary structure 30, according to an illustrative embodiment. The retroreflector 5 and base 10 can be manufactured using a replication method. The petals of the retroreflector 15A, 15B and 15C and base 10 are machined from a single structure 85. The surfaces of the petals can be machined to be flat and mutually perpendicular to one another, forming a crevice in the structure. Fastening mechanisms 25 can also be machined from the structure. A second structure 90 is formed that is a negative replication of the surface formed by the petals 15A, 15B and 15C. The structure forming the negative replication 90 is coated with materials necessary generate a reflective surface. In some embodiments, the structure 90 is coated with gold and epoxy. The epoxy can be used to compensate for any deviations in the surface of the petals that may prevent the surface from being flat. The structure 90 can be inserted into the crevice formed by the petals 15A, 15B and 15C. The reflective material is transferred on to the surface of the petals by known mirror replication methods, forming a retroreflective surface.

Figure 6:
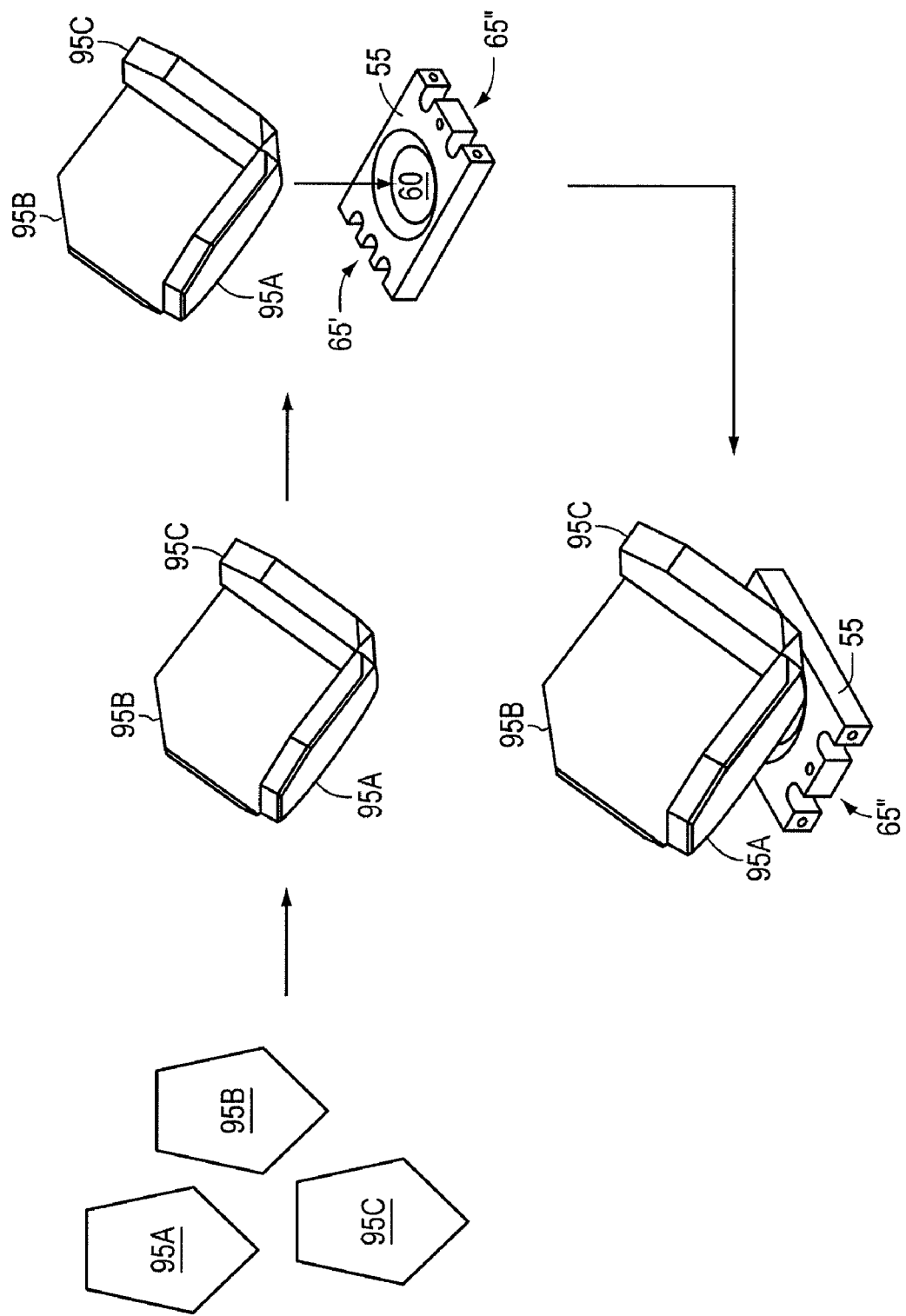
FIG. 6 is a drawing depicting a method for manufacturing a retroreflector connected to a base, according to an illustrative embodiment.

FIG. 6 depicts the steps for a method of manufacturing a retroreflector and base assembly, according to an illustrative embodiment. Individual petals 95A, 95B and 95C having reflective surfaces are adhered to be mutually perpendicular to one another, forming a retroreflector 40. The petals 95A, 95B and 95C can be pieces of glass that are individual mirrors. A base 55, which can be separately machined or formed, has an indentation 60 that is configured to receive the petals 95A, 95B and 95C of the retroreflector 40. The base 55 has a fastening mechanism 65' and 65" to removably mount the base 55 and retroreflector 40 to a motor. The petals 95A, 95B and 95C are placed in the indentation 60 in the base 55. In some embodiments, only one of the petals 95A, 95B and 95C is adhered to the indentation 60 in the base 55. The petal can be adhered to the indentation 60 by disposing epoxy between the petal and the base 55. Room-temperature vulcanizing silicone can be disposed between the indentation 60 and the other remaining petals.

While the invention has been particularly shown and described with reference to specific illustrative embodiments, it should be understood that various changes in form and detail may be made without departing from the spirit and scope of the invention.

What is claimed is:

1. A retroreflector adapted to be mounted to a motor comprising:
    a first, second, and third petal comprising a mutually perpendicular first, second, and third reflective surface that form a retroreflective surface, the first, second, and third petals are adhered to each other to form the retroreflective surface; and
    a base directly connected and adhered to at least one of the first, second, or third petal so as to minimize a vertical profile of the retroreflector, the base being removably connected to the motor with a fastening mechanism wherein a spatial distance between the fastening mechanism and at least one of the first, second, or third petal minimizes a stress from the motor propagated to the retroreflective surface, the base having an indentation that the first petal is adhered to; and a room-temperature vulcanizing silicone is disposed between the indentation in the base and the second and third petal.

2. The apparatus of claim 1 wherein the petals and base form a unitary structure.

3. The apparatus of claim 2 wherein the petals and base are aluminum and the first, second, and third surface are coated to form the reflective surface.

4. The apparatus of claim 1 wherein the base is glass.

5. The apparatus of claim 1 wherein the fastening mechanism comprises a plurality of passages.

6. The apparatus of claim 5 wherein screws are threaded in the passages to mount the retroreflector to the motor.

7. A retroreflector adapted to be mounted to motor comprising:

a first, second, and third petal comprising a mutually perpendicular first, second, and third reflective surface that form a retroreflective surface; and a base directly connected to at least one of the first, second, or third petal so as to minimize a vertical profile of the retroreflector, the base being removably connected to the motor with a fastening mechanism wherein a spatial distance between the fastening mechanism and at least one of the first, second, or third petal minimizes a stress from the motor propagated to the retroreflective surface, wherein the motor is a linear flexure motor.

8. The apparatus of claim 7 wherein the petals and base form a unitary structure.

9. The apparatus of claim 8 wherein the petals and base are aluminum and the first, second, and third surface are coated to form the reflective surface.

10. The apparatus of claim 7 wherein the base is glass.

11. The apparatus of claim 7 wherein the fastening mechanism comprises a plurality of passages.

12. The apparatus of claim 11 wherein screws are threaded in the passages to mount the retroreflector to the motor.

13. A retroreflector assembly adapted to be attached to a motor comprising:

a first petal comprising a first reflective surface, a second petal comprising a second reflective surface, and a third petal comprising a third reflective surface wherein the first, second and third petal are connected to each other to form a retroreflective surface; and a base wherein one of the first, second, or third petal is connected to the base so as to minimize a vertical profile of the retroreflector, the base being removably mounted to the motor with a fastening mechanism wherein a spatial distance between the fastening mechanism and the petals minimizes a stress propagated to the retroreflective surface, the base comprising an indentation adapted to receive the first, second and third petal; and a room-temperature vulcanizing silicone is disposed between the indentation in the base and at least one of the second or third petal.

14. The apparatus of claim 13 wherein the base and petals are glass.

15. The apparatus of claim 13 wherein the base and petals are formed from a material having a stable thermal cycle over time.

16. The apparatus of claim 13 wherein the base and petals are formed from a material having minimal hysteresis.

17. The apparatus of claim 13 wherein the fastening mechanism comprises a plurality of passages.

18. The apparatus of claim 17 wherein screws are threaded in the passages to mount the base to the motor.

19. The apparatus of claim 13 wherein adhesive is disposed between the first petal and the indentation in the base.

* * * * *